(12) United States Patent
Witt et al.

(10) Patent No.: US 10,976,289 B2
(45) Date of Patent: Apr. 13, 2021

(54) CORRECTED FLOW REPORTING UNDER DYNAMIC CONDITIONS BY SYSTEM MODELING

(71) Applicant: Agilent Technologies, Inc., Santa Clara, CA (US)

(72) Inventors: Klaus Witt, Keltern (DE); Konstantin Shoykhet, Karlsruhe (DE); Philip Herzog, Walbronn (DE); Iwan Bouzid, Waldbronn (DE)

(73) Assignee: Agilent Technologies, Inc., Santa Clara, CA (US)

( * ) Notice: Subject to any disclaimer, the term of this patent is extended or adjusted under 35 U.S.C. 154(b) by 690 days.

(21) Appl. No.: 15/691,202

(22) Filed: Aug. 30, 2017

(65) Prior Publication Data

US 2019/0064124 A1 Feb. 28, 2019

(51) Int. Cl.
| | |
|---|---|
| *G01N 30/32* | (2006.01) |
| *G01N 30/86* | (2006.01) |
| *G01N 30/02* | (2006.01) |
| *G01N 30/20* | (2006.01) |

(52) U.S. Cl.
CPC ......... *G01N 30/32* (2013.01); *G01N 30/8658* (2013.01); *G01N 30/8693* (2013.01); *G01N 30/20* (2013.01); *G01N 2030/027* (2013.01); *G01N 2030/324* (2013.01)

(58) Field of Classification Search
CPC .... G01N 30/32; G01N 30/20; G01N 30/8658; G01N 30/8693; G01N 2030/027; G01N 2030/324
See application file for complete search history.

(56) References Cited

U.S. PATENT DOCUMENTS

| | | | | |
|---|---|---|---|---|
| 3,917,531 A | * | 11/1975 | Magnussen ............ | G01N 30/36 210/101 |
| 4,733,152 A | * | 3/1988 | Allington ............... | G01N 30/32 210/101 |
| 5,004,538 A | | 4/1991 | Apfel | |

(Continued)

FOREIGN PATENT DOCUMENTS

DE  102015100693 A1  7/2016

OTHER PUBLICATIONS

Kaanta, B.C., et al. "A Novel μThermal Conductivity Detector Capable of Flow Rate Measurements" IEEE Sensors conf. (2010) (Year: 2010).*

(Continued)

*Primary Examiner* — Jay Hann

(57) ABSTRACT

To determine a corrected flow rate value of a mobile phase flowing in a liquid chromatography (LC) system, a flow rate of the mobile phase at a selected reference position in the LC system is measured to produce one or more flow rate values. A model of the LC system is applied to the flow rate value(s) to determine the corrected flow rate value(s). The model includes a distribution of capacitive elements and resistive elements arranged according to a topology of the LC system. The capacitive and resistive elements are representative of system and solvent properties affecting flow rate while operating the LC system. The system and solvent properties may be properties affecting the flow rate while operating the LC system under dynamic conditions.

19 Claims, 3 Drawing Sheets

(56) References Cited

U.S. PATENT DOCUMENTS

| | | | | |
|---|---|---|---|---|
| 5,441,613 | A | * | 8/1995 | McCormick ..... G01N 27/44752 204/452 |
| 8,205,485 | B2 | * | 6/2012 | Suzuki ............... G01N 30/8665 73/61.52 |
| 8,640,730 | B2 | * | 2/2014 | Gerhardt ................ G01N 30/34 137/468 |
| 9,103,814 | B2 | * | 8/2015 | Ciavarini ............... G01N 30/32 |
| 9,423,384 | B2 | | 8/2016 | Witt et al. |
| 9,618,485 | B2 | * | 4/2017 | Witt ........................ G01N 30/32 |
| 2006/0219618 | A1 | | 10/2006 | Witt et al. |
| 2012/0096919 | A1 | * | 4/2012 | Choikhet ............... G01N 30/88 73/1.02 |

OTHER PUBLICATIONS

Cramers, C. A. et al.; "Factors Determining Flow Rate in Chromatographic Columns" Chromatographia vol. 14 No. 7, Jul. 1981, pp. 439-444.

Hinshaw, John V.; "Flow or Velocity?" LCGC North America, vol. 34, Issue 3, p. 198-205, Mar. 1, 2016.

Janssen, Hans-Gerd et al.; "The Effects of the Column Pressure Drop on Retention and Efficiency in Packed and Open Tubular Supercritical Fluid Chromatography" Journal of High Resolution Chromatography, vol. 14, Jul. 1991, pp. 438-445.

User Manual, Agilent 1290 Infinity Binary Pump VL, Agilent Technologies, Aug. 2012.

* cited by examiner

CORRECTED FLOW REPORTING UNDER DYNAMIC CONDITIONS BY SYSTEM MODELING

TECHNICAL FIELD

The present invention relates generally to liquid chromatography (LC), and particularly to the correction of an indication of a measured or calculated fluid flow rate in an LC system.

BACKGROUND

In a liquid chromatography (LC) system, a mobile phase consisting of one or more solvents is driven under a high system pressure through a sample separation unit, which often is provided in the form of a chromatography column. In high-performance LC (HPLC) systems and ultra high-performance LC (UHPLC) systems, the system pressure may be as high as, for example, about 1200 bar. The column contains a stationary phase, which in LC is typically provided in the form of a packed bed of particles such as, for example, silica beads. The particles are formulated and/or functionalized so as to separate different components (e.g., chemical compounds) of a sample. The sample to be so processed by the LC system is injected into the mobile phase at a point upstream of the column. The sample is then transported with the mobile phase through the column at the high system pressure. As the sample flows though the column, the sample contacts the stationary phase. The different components of the sample have different affinities for the stationary phase. This causes the different components to separate from each other in the liquid flow though the column. Consequently, the different components elute from the column outlet at different times. Hence, the flow of liquid outputted from the column contains a series of bands, each band consisting of a distinct component of the sample. That is, the bands respectively consist of the different components of the sample that were separated from each other by the column.

From the column outlet, the mobile phase and the series of bands carried therein flow to a detector configured to detect each individual band. As one example, the detector may include a flow cell through which the liquid flows, a light source, and a light detector configured to make optical-based measurements (e.g., absorbance) on the liquid flowing through the flow cell. Electrical signals produced by the detector may then be utilized to produce a chromatogram. Typically, the chromatogram plots signal intensity as a function of Run time (i.e., analysis time), or alternatively as a function of Run volume. The data plot appears as a series of peaks corresponding to the series of respective bands detected by the detector. In analytical chromatography, the chromatogram is utilized to identify and quantify components in the sample. Alternatively, in preparative chromatography the separating power of the column may be utilized to purify the sample, for example to isolate a target compound from other compounds contained in the sample.

When evaluating the analytical results of a chromatographic run on a sample, relying only on the detector-generated data utilized to produce the chromatogram may not be sufficient. This is particularly the case when operating under fast changing dynamic conditions such as when performing a gradient run faster than a few minutes (e.g., 3 min or less). Operating parameters such as the solvent flow rate in the LC system can affect the accuracy of the solvent composition (mixing ratio) of the mobile phase and the reliability of the chromatogram. Flow rate data and other data relating to instrument performance may need to be utilized to evaluate the analytical results of a chromatographic run, in addition to the peak data derived from the signals outputted by the detector.

Conventionally, the set-point flow rate value(s) at which the LC system was programmed to operate are relied upon, with the assumption that the set-point flow rate value(s) accurately represent actual (or real) flow rates implemented by the LC system during the chromatographic run. However, the actual (or real) flow rate of a solvent or composite solvent at a given position in an LC system may be different from the set-point flow rate at which the LC system has been programmed to operate. The deviation in the actual flow rate from the set-point flow rate may be due to one or more dynamic conditions or events occurring in the LC system during operation at a particular point in time, as described further below.

Instead of relying on the predetermined set-point flow rate values, a flow measurement device positioned at an appropriate location in the LC system may be utilized to monitor the flow rate in real time during operation of the LC system, and the LC system may record (report) the acquired flow rate data. However, the flow measurement device may not accurately measure the flow rate, i.e. the flow rate values as measured by a sensor that is sensitive to the actual liquid composition or other influences may be different from the actual (real) volumetric flow rate values. Consequently, the reporting of flow rate data based on measurements taken by the flow measurement device of common nature is inaccurate, especially under dynamic conditions where the composition of the mobile phase and/or other factors such as, for example, temperature or pressure, change rapidly.

In view of the foregoing, there is a need for correcting flow rate data acquired during the operation of an LC system.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a method is provided for determining a corrected flow rate value of a mobile phase flowing in a liquid chromatography (LC) system, the LC system including a column configured to separate sample components of a sample and one or more pumps configured to deliver one or more solvents as a mobile phase and to drive the mobile phase through the column, the method including: operating the LC system to drive the mobile phase with the sample through the column according to a set-point flow rate value to separate the sample components; while operating the LC system to drive the mobile phase, measuring a pressure or a flow rate of the mobile phase at a measurement position in the LC system to produce measured data, the measured data including values of pressure or flow rate over time; and determining the corrected flow rate value by applying a model of the LC system to the measured data, wherein: the LC system has a topology defined by an arrangement of system components, the system components comprising the column, the one or more pumps, and a plurality of fluid lines respectively fluidly coupled to the column and the one or more pumps; and the model includes a distribution of capacitive elements and resistive elements arranged according to the topology, the capacitive elements and the resistive elements being representative of system and solvent properties affecting flow rate while operating the LC system.

According to another embodiment, a liquid chromatography (LC) system includes: a column configured to separate configured to separate sample components of a sample of the sample; one or more pumps configured to deliver one or more solvents as a mobile phase and to drive the mobile phase with the sample through the column to separate the sample components; a plurality of fluid lines respectively fluidly coupled to the column and the one or more pumps; and a controller comprising a processor, a memory, and a flow rate value corrector configured to: receive a measured signal value for pressure or flow rate of the mobile phase at a measurement position in the LC system; and apply a model of the LC system to the measured signal value to produce the corrected flow rate, wherein: the LC system has a topology defined by an arrangement of system components, the system components including the column, the one or more pumps, and the plurality of fluid lines; and the model includes a distribution of capacitive elements and resistive elements arranged according to the topology, the capacitive elements and the resistive elements being representative of system and solvent properties affecting flow rate while operating the LC system under dynamic conditions.

In an embodiment, the system model is applied to the measured data to determine the corrected flow rate value at a reference position in the LC system different from the measurement position.

In an embodiment, the steps of measuring the pressure or the flow rate and determining the corrected flow rate value are repeated for one or more additional reference positions to produce one or more additional corrected flow rate values corresponding to the one or more additional reference positions.

In an embodiment, the system and solvent properties are or include properties affecting the flow rate while operating the LC system under dynamic conditions.

In an embodiment, examples of system and solvent properties include, but are not limited to, one or more of the following: an elasticity of one or more of the system components; a flow restriction imposed by one or more of the system components to a flow of one or more of the solvents or a mixture thereof; a pressure of the mobile phase at one or more points in the LC system; a viscosity of the mobile phase at one or more points in the LC system; a temperature of the mobile phase at one or more points in the LC system; a solvent compressibility at one or more points in the LC system; a compressibility of a liquid segment added to the mobile phase while driving the mobile phase; a volumetric contraction of the mobile phase at one or more points in the LC system; and a thermal expansion coefficient of the mobile phase at one or more points in the LC system.

In an embodiment, the dynamic conditions are or include changes over time of one or more of the system and solvent properties. Examples of such dynamic conditions include, but are not limited to, one or more of the following: changes of cavity volume in a section of a flow path due to elasticity; changes of a flow restriction imposed by one or more of the system components to a flow of one or more of the solvents; changes of a viscosity of the mobile phase at one or more points in the LC system; changes in occupied volume by solvent in a section of a flow path due to compressibility in reaction to pressure changes; changes of a solvent compressibility at one or more points in the LC system; changes of a volumetric contraction of the mobile phase at one or more points in the LC system; changes in occupied volume by solvent in a section of a flow path due to thermal expansion in reaction to local temperature changes; changes of a thermal expansion coefficient of the mobile phase at one or more points in the LC system; switching a volume compartment into or out of a flow path of the LC system; switching a flow path of the LC system; and changing a mixing ratio of the mobile phase while driving the mobile phase.

In an embodiment, the LC system includes a flow combiner. In this case, a plurality of solvents are utilized, and the LC system includes one or more pumps configured to deliver the plurality of solvents to the flow combiner to form a composite solvent as the mobile phase and to drive the mobile phase from the flow combiner through the column.

In an embodiment, before measuring the pressure or the flow rate, a liquid segment is injected into the mobile phase at a position upstream of the column.

In an embodiment, while operating the LC system to drive the mobile phase, a solvent composition of the mobile phase is varied over time according to a gradient program.

In an embodiment, measuring the pressure or the flow rate is done at a time when the LC system starts to drive the mobile phase. Additionally or alternatively, the method includes stopping the driving of the mobile phase, wherein measuring the pressure or the flow rate is done after stopping. Additionally or alternatively, the method includes operating the LC system to vary the flow rate while driving the mobile phase, wherein measuring the flow rate is done while varying the flow rate.

In one embodiment, determining the corrected flow rate value is done over continuous segments of time during operation of the LC system. In another embodiment, determining the corrected flow rate value is done continuously during operation of the LC system.

In an embodiment, the method includes producing a chromatogram, which includes peaks corresponding to the sample components separated in the column and detected by a detector of the LC system. The method may include modifying the chromatogram based on the corrected flow rate value. Modifying the chromatogram may include shifting one or more signal data points produced by the detector along a time axis of the chromatogram, or shifting one or more of the peaks along a time axis of the chromatogram.

In an embodiment, the method includes, based on the corrected flow rate value, adjusting an operating parameter of the LC system such that the corrected flow rate value of the mobile phase at a reference position in the LC system is equal to or substantially equal to the set-point flow rate value, wherein the reference position is the same as the measurement position or is different from the measurement position. In the present context, as one non-limiting example, "substantially equal" is taken to mean a range spanning ±10% of the set-point flow rate value.

In an embodiment, applying the model includes accessing data stored in a memory, for example data indicative of the distribution of capacitive elements and resistive elements arranged according to the topology. Such data may be stored in the form of, for example, one or more look-up tables, databases, mathematical descriptions, and/or algorithms.

In an embodiment, measuring the pressure or the flow rate of the mobile phase at the selected measurement position comprises outputting a measurement signal from a sensor located at a selected measurement position, such as a pressure or flow (rate) sensor. In the case of a pressure sensor, the corrected flow rate value is based on the pressure signal, i.e. an appropriate calculation is made as appreciated by persons skilled in the art.

In an embodiment, while the sensor may be located at a given measurement position, the flow rate of interest may be located at a reference position in the LC system that is different from the measurement position. For example, the reference position may be located downstream from the measurement position. The method disclosed herein may be performed to determine corrected flow rate value(s) of a mobile phase flowing in the LC system at a selected reference position, based on sensor data acquired at a differently located measurement position of the LC system.

In an embodiment, the LC system includes a flow combiner, and one or more pumps are configured to deliver the plurality of solvents to the flow combiner to form a composite solvent as the mobile phase and to drive the mobile phase from the flow combiner through the column.

In an embodiment, the controller of the LC system is configured to modify a chromatogram based on the corrected flow rate value.

In an embodiment, the LC system includes a sensor located at the measurement position and configured to output a measurement signal. In some embodiments, the sensor is a pressure sensor and the measurement signal is a pressure signal, and the flow rate value corrector is configured to determine the corrected flow rate value at a reference position based on the pressure signal.

According to another embodiment, an LC system is configured for performing all or part of any of the methods disclosed herein.

According to another embodiment, a system for acquiring LC data from a sample includes: a processor and a memory configured for performing all or part of any of the methods disclosed herein.

According to another embodiment, a non-transitory computer-readable storage medium includes instructions for performing all or part of any of the methods disclosed herein.

According to another embodiment, a system includes the computer-readable storage medium.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
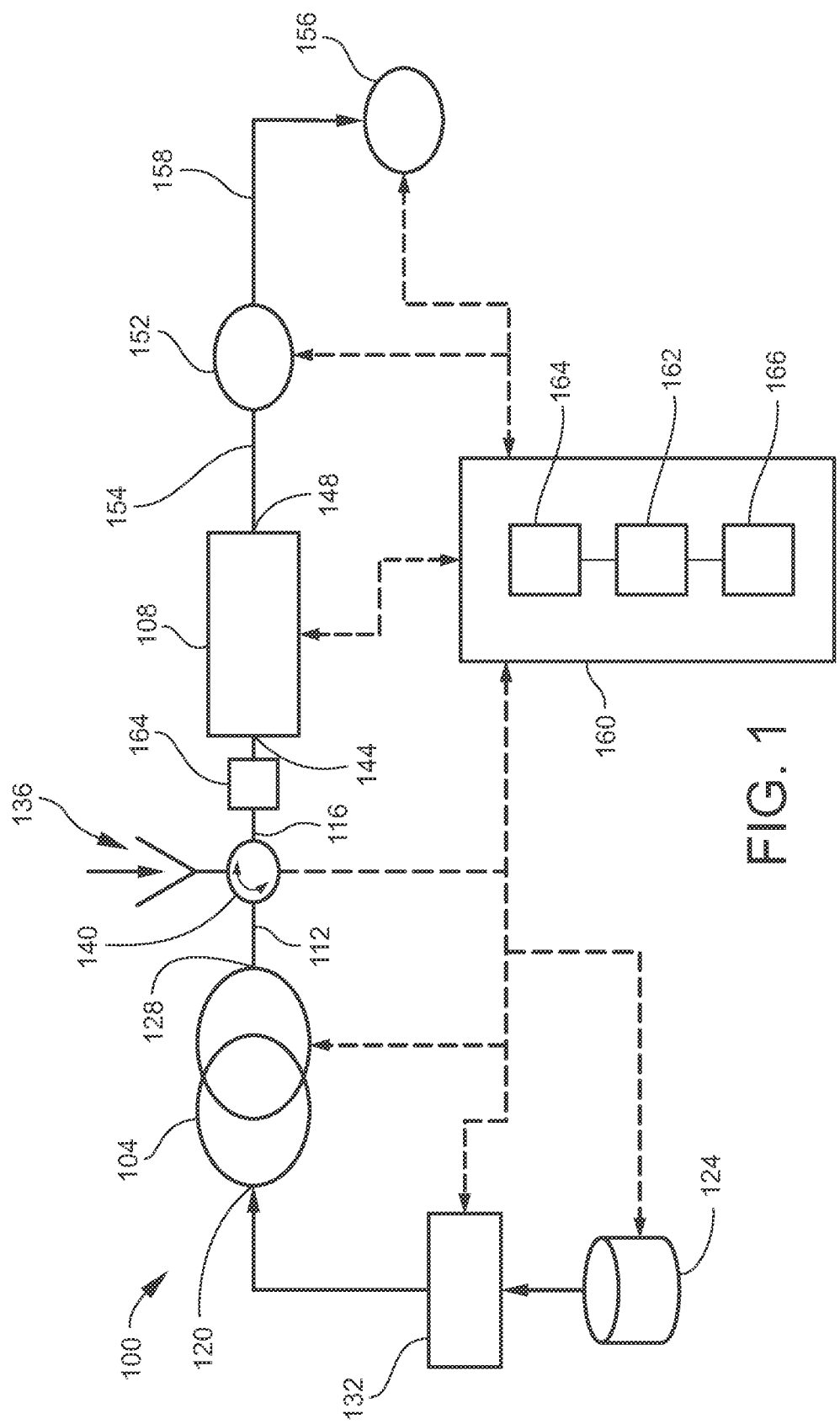
FIG. 1 is a schematic view of an example of an LC system according to an embodiment.

FIG. 1 is a schematic view of an example of an LC system 100 according to some embodiments, which may be utilized in the implementation of the subject matter described herein. The LC system 100 may be, for example, a high-performance LC (HPLC) system or an ultra high-performance LC (UHPLC) system, as appreciated by persons skilled in the art. The operation and design of various components of LC systems are generally known to persons skilled in the art and thus need not be described in detail herein. Instead, certain components are briefly described to facilitate an understanding of the subject matter presently disclosed.

The LC system 100 includes a pump 104 configured for pumping a mobile phase along a mobile phase flow path at high pressure (or system pressure) to a chromatographic column (or separation column) 108. In the present context, examples of "high pressure" include, but are not limited to, a range of 100 bar or greater, from 100 bar to 1200 bar, a range from 200 bar to 1200 bar, and a range from 500 bar to 1200 bar or above. The mobile phase flow path may be defined by various fluid conduits, such as a first mobile phase line 112 and a second mobile phase line 116, and components operatively communicating with or switchable into communication with such mobile phase lines 112 and 116. The pump 104 includes a pump inlet 120 communicating with a solvent supply source 124, and a pump outlet 128 communicating with the first mobile phase line 112. The mobile phase may include a single type of solvent or a mixture of two or more different solvents, which mixture may even be programmed to change over Run time (gradient elution).

To achieve fast gradients, the pump 104 may include two or more individual pumping units arranged in parallel and/or in series. The individual pumping units often are reciprocating piston-type pumping units, i.e., each pumping unit includes a respective piston driven to reciprocate in a respective pump chamber. As one example, the pump 104 may have a binary configuration in which a first serial-type dual-piston pumping module is arranged in parallel with a second serial-type dual-piston pumping module. Each dual-piston pumping module includes a primary pumping unit and a secondary pumping unit arranged in series, whereby the outlet of the primary pumping unit communicates with the inlet of the secondary pumping unit. With the binary configuration, the illustrated pump inlet 120 is defined by the two parallel inlets of the respective primary pumping units of the two dual-piston pumping modules, and the illustrated pump outlet 128 is defined by a fluidic junction combining the two parallel outlets of the respective secondary pumping units of the two dual-piston pumping modules. The primary pumping unit intakes solvent, pressurizes the solvent to high pressure, and delivers the solvent to the secondary pumping unit during the intake stroke of the secondary pumping unit. The relative phases of piston motion of the primary pumping unit and the secondary pumping unit may be set (e.g., about 180 degrees phase offset from each other) such that during the intake stroke of the secondary pumping unit, a first portion of the solvent delivered by the primary pumping unit fills the chamber of the secondary pumping unit while at the same time a second portion of the solvent delivered by the primary pumping unit is outputted through the outlet of the secondary pumping unit. Subsequently, the secondary pumping unit during its discharge stroke outputs the remaining (first) portion of the solvent through the outlet of the secondary pumping unit, while the primary pumping unit during its intake stroke intakes (draws in, or receives) solvent at its inlet from the solvent supply source 124.

A serial-type dual-piston pumping module is useful for delivering solvent(s) at a highly controllable constant or varied flow rate with minimal pressure pulses. The binary configuration is useful for delivering a blend of two different solvents (e.g., solvent A and solvent B), which can be mixed in an appropriate mixing unit (not shown) on the high-pressure outlet side of the pump 104 before the mixture reaches the separation column 108. In this case, the pump outlet 128 (the parallel outlets of the two pumping modules) delivers a flow of solvent A and a flow of solvent B to the mixing unit, which communicates with the first mobile phase line 112. Additional pumping modules (such as additional serial-type dual-piston pumping modules) may be provided to deliver additional solvents. Thus, the composition of the mobile phase supplied to the first mobile phase line 112 may include two or more solvents. The pump 104 (pumping units) may be operated in an isocratic mode in which the solvent composition of the mobile phase is kept constant over time, or in a gradient mode in which the solvent composition is varied over time. As an example of the gradient mode, the amount of solvent A in the mobile phase may be varied (e.g., ramped down) from 100% to 0% over a predetermined period of time while the amount of solvent B in the mobile phase is varied (e.g., ramped up) from 0% to 100% over the same predetermined period of time (i.e., the same period of time during which solvent A is ramped down).

When two or more solvents are to be utilized, the solvent supply source 124 may include two or more solvent reservoirs that communicate with respective pumping modules via respective solvent supply lines. As illustrated in FIG. 1, a degasser 132 may be provided in the solvent supply line(s) to remove dissolved gases from the solvent stream(s).

In an alternative embodiment, two or more solvents may be mixed on the lower-pressure inlet side of the pump 104, in which case the pump 104 may include a single pumping module (such as a serial-type dual-piston pumping module). In this case, a mixer, such as in the form of (or fluidly communicating with) a proportioning valve (not shown), may be provided between the pump inlet 120 and the solvent supply source 124. The proportioning valve is configured to receive flows of the different solvents from the reservoirs of the solvent supply source 124, and combine them in the desired proportions (according to either the isocratic mode or gradient mode) to feed the pump inlet 120.

The LC system 100 further includes a sample injector 136 configured to inject a sample to be analyzed into the mobile phase flow path, such that the sample is transported by the mobile phase to the column 108 and driven through the column 108 at the high system pressure. The sample injector 136 typically includes an injection valve 140 receiving the sample and communicating with the first mobile phase line 112 and the second mobile phase line 116.

The column 108 includes a column inlet 144 communicating with the second mobile phase line 116 and a column outlet 148 communicating with a detector 152 via a column output line 154. The column 108 may include a stationary phase as described above as separation media, through which the sample and the mobile phase are driven. As described above, different compounds of the sample have different degrees of affinity for the stationary phase under the condition of a present mobile phase, and thus are retained differently by the stationary phase. As a result, as the sample flows through the stationary phase, the different compounds travel at different speeds and become separated from each other, and thus reach the column outlet 148 at different times, consequently eluting from the column outlet 148 in distinct bands, carried along by the mobile phase. The detector 152 is configured to detect these bands and output electrical signals from which a chromatogram representative of the sample under analysis may be produced, with peaks in the chromatogram corresponding to the respective bands detected. In some embodiments, the fluidic output of the detector 152 may be directed to a fractionating unit 156 via a detector output line 158. The fractionating unit 156 is configured to collect the separated compounds as respective fractions of the sample. The column output line 154 and the detector output line 158 may be considered as being part of the mobile phase flow path of the LC system 100.

As further illustrated in FIG. 1, the LC system 100 may further include a system controller (or computing device) 160. The schematically illustrated controller 160 may represent one or more modules (units, components, devices, etc.) configured for controlling, monitoring, and/or synchronizing the operations of various components of the LC system 100. The controller 160 may be configured for receiving measurement signals from various measurement devices (e.g., motion sensors, pressure sensors, flow rate sensors, temperature sensors, etc.) and take responsive actions as needed as part of controlling the LC system 100. The controller 160 may also be configured for receiving the measurement signals from the detector 152 and performing tasks relating to data acquisition and signal analysis as necessary to generate chromatograms or even interpret the results quantitatively. The controller 160 may also be configured for providing and controlling a user interface that provides screen displays of chromatographic data, instrument data (e.g., operating parameters, performance metrics, etc.), and other data with which a user may interact. One or more modules of the controller 160 may be, or be embodied in, for example, a computer workstation, desktop computer, laptop computer, portable computer, tablet computer, handheld computer, mobile computing device, personal digital assistant (PDA), smartphone, etc. The controller 160 may include one or more reading devices on or in which a non-transitory or tangible computer-readable (machine-readable) medium may be loaded that includes instructions for performing all or part of any of the methods disclosed herein. For all such purposes, the controller 160 may be in electrical communication with various components of the LC system 100 via wired or wireless communication links, as represented by dashed lines in FIG. 1. Also for these purposes, the controller 160 may include one or more types of hardware, firmware and/or software, as appreciated by persons skilled in the art.

The controller 160 may also include one or more device drivers for controlling one or more types of user interface devices and providing an interface between the user interface devices and components of the controller 160 communicating with the user interface devices. Such user interface devices may include user input devices (e.g., keyboard, keypad, touch screen, mouse, joystick, trackball, and the like) and user output devices (e.g., display screen, printer, visual indicators or alerts, audible indicators or alerts, and the like). In various embodiments, the controller 160 may be considered as including one or more user input devices and/or user output devices, or at least as communicating with them. The controller 160 may also include one or more types of computer programs or software contained in memory and/or on one or more types of computer-readable media. Computer programs or software may contain instructions (e.g., logic instructions) for performing all or part of any of the methods disclosed herein. Computer programs or software may include application software and system software. System software may include an operating system (e.g., a Microsoft Windows® operating system) for controlling and managing various functions of the controller 160, including interaction between hardware and application software. The operating system may provide a graphical user interface (GUI) displayable via a user output device such as a display screen, and with which a user may interact with the use of a user input device such as a keyboard or a pointing device (e.g., mouse). The controller 160 may also include one or more data acquisition/signal conditioning components (as may be embodied in hardware, firmware and/or software) for receiving and processing ion measurement signals outputted by the detector 152, including formatting data for presentation in graphical form by the GUI.

In the illustrated embodiment, the controller 160 includes one or more electronics-based processors 162, one or more memories 164, and a flow rate value corrector (or correction module, unit, component, device, etc.) 166. The schematically illustrated processor(s) 162 may be representative of a main electronic processor providing overall control, and one or more electronic processors configured for dedicated control operations or specific signal processing tasks (e.g., a graphics processing unit, or GPU). The memories 164 are configured for storing data and/or software. One or more of the memories 164 may be volatile and/or non-volatile, and may include data structures in the form of, for example, one or more databases and/or look-up tables to which various types of data may be addressed. The structure and operation of the flow rate value corrector 166 is described in further detail herein.

Figure 2:
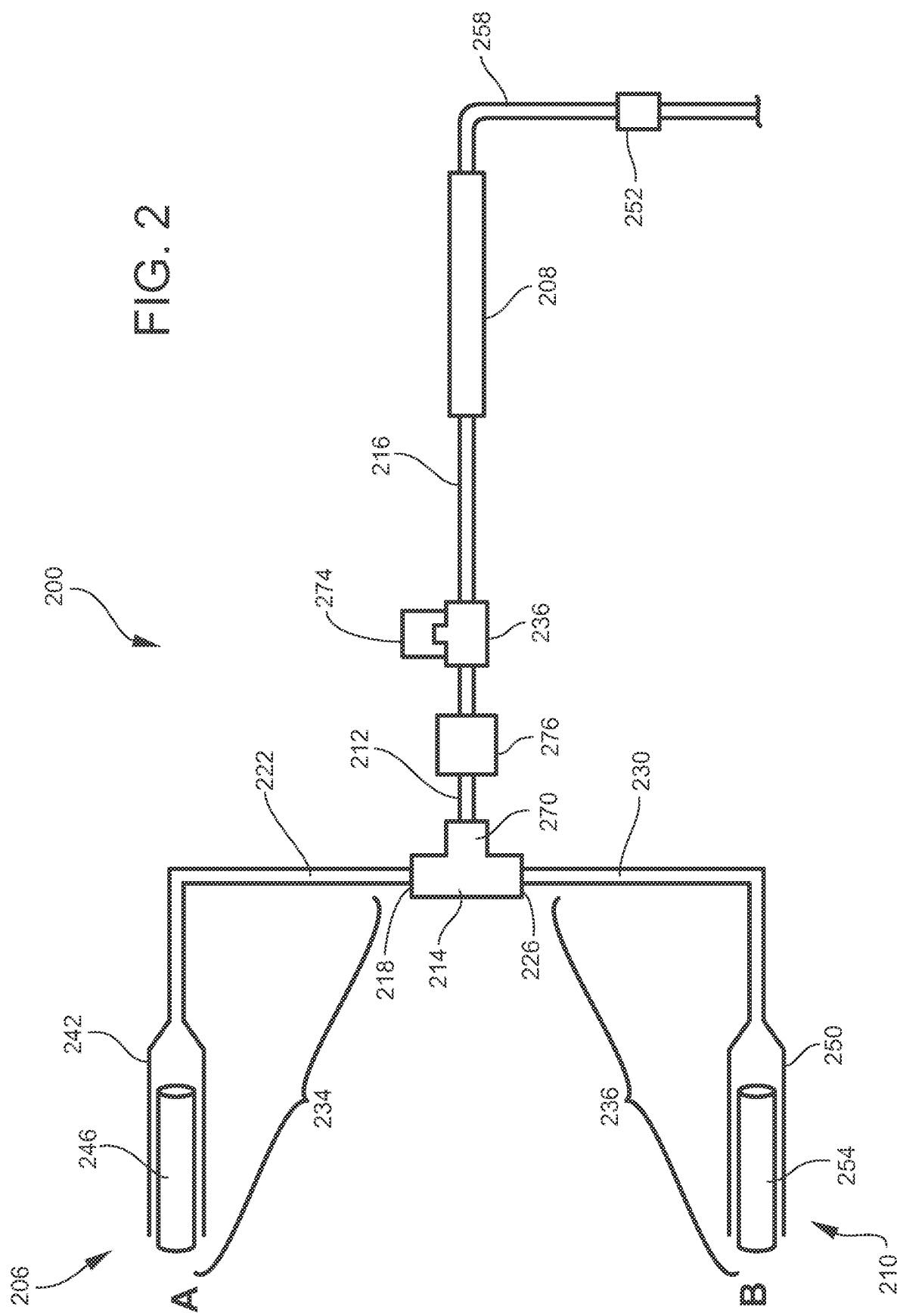
FIG. 2 is a schematic view of an example of an LC system according to an embodiment in which two or more solvents are delivered as a composite solvent according to a predetermined solvent mixing ratio that is either fixed (isocratic mode) or varied (gradient mode) over time.

FIG. 2 is a schematic view of an example of an LC system 200 according to an exemplary embodiment in which two or more solvents are delivered as a composite solvent according to a determined solvent mixing ratio that is either fixed (isocratic mode) or varied (gradient mode) over time. In this embodiment, the solvent delivery pump of the LC system 200 has a binary configuration in which a first pump 206 is arranged in parallel with a second pump 210. The first pump 206 is coupled to a fluidic flow combiner (or flow junction or flow joining component) 214 (specifically to a first flow combiner inlet 218 thereof) via a first solvent delivery line 222. The second pump 210 is coupled to the flow combiner 214 (specifically to a second flow combiner inlet 226 thereof) via a second solvent delivery line 230. The first pump 206 and first solvent delivery line 222 define a first solvent channel 234 for supplying a first solvent A to the flow combiner 214. The second pump 210 and second solvent delivery line 230 define a second solvent channel 236 for supplying a second solvent B to the flow combiner 214. The first pump 206 includes a first pump chamber 242 in which a first piston 246 reciprocates. The second pump 210 includes a second pump chamber 250 in which a second piston 254 reciprocates. The first pump 206 and the second pump 210 may be representative of serial-type dual-piston pumps as described above.

The flows of solvent A and solvent B are merged or combined in the flow combiner 214, thereby forming a composite solvent by sufficient mixing, so that the composite solvent serves as the mobile phase in the LC system 200. The desired or predetermined mixing ratio of the composite solvent, whether fixed or varied, is dictated by the respective flow rates of solvent A and solvent B in the respective solvent delivery lines 222 and 230. The respective flow rates of solvent A and solvent B are dictated by the respective pump speeds of the first pump 206 and the second pump 210 (i.e., the movement speeds of the first piston 246 and the second piston 254 while displacing the respective liquids from the pump chambers 242 and 250). The flow combiner 214 may be a plain "T" connection or a "Y" connection as illustrated or may include additional structure configured to enhance mixing. The composite solvent formed in the flow combiner 214 then flows from a flow combiner outlet 270 through the mobile phase flow path. In the present embodiment, the mobile phase flow path includes a first mobile phase line 212, a component of a sample injector 236 such as an injection valve as described herein, a second mobile phase line 216, an LC column 208, a column output line 258, a detector 252, and on to an appropriate destination site such as a fraction collector or a waste receptacle.

As also shown in FIG. 2, the sample injector 236 may include a sample loop 274. In an embodiment, the sample loop 274 is part of or coupled to an injection valve movable (rotatable or slidable) to different switching states that define different flow paths. For example, in a sample loading state, the sample loop 274 is switched out of communication with the high-pressure mobile phase flow path and depressurized, for example down to about ambient pressure, thereby enabling a volume of sample to be loaded into the sample loop 274 from a suitable sample source (e.g., a vial) by operating a suitable sample moving device (e.g., a syringe pump with a needle insertable in a vial). In a sample injection state, the sample loop 274 is switched into communication with the mobile phase flow path, i.e. becomes part of the mobile phase flow path, thereby enabling the sample to become part of the mobile phase flow into the column 208.

As one typical yet non-exclusive example, the injection valve of the sample injector 236 may be configured to switch among different fluid flow paths made available by different fluid conduits coupled to ports of the injection valve. As one non-exclusive example, the injection valve may be a 6-port rotary injection valve. Such an injection valve may include, in addition to six ports, two or more arcuate channels or grooves. The body of the injection valve includes a stationary portion and a rotary portion that is drivable to rotate in an indexed manner (by a suitable motorized drive mechanism) relative to the stationary portion. The injection valve is thus capable of selectively switching to multiple valve positions, such as the sample loading state and the sample injection state noted above. Either the stationary portion or the rotary portion includes the ports, and the other portion includes the grooves. The grooves are sized and shaped such that at any valve position, each groove fluidly couples a pair of adjacent ports, one of which serves as an inlet port leading into the groove while the other serves as an outlet port leading out from the groove. At different valve positions, each groove fluidly couples a different pair of adjacent ports. By this configuration, different flow paths going into and out from the injection valve can be defined, depending on which pairs of ports have been fluidly coupled by which grooves (according to the valve position selected).

As also shown in FIG. 2, the LC system 200 may include one or more sensors 276 located at (i.e., operatively communicating with) different positions in the flow paths of the LC system where measurement of pressure or fluid flow rate is desired. The sensors 276 may be flow rate (e.g., volumetric flow rate) sensors and/or pressure sensors. For simplicity, FIG. 2 illustrates only one sensor 276, which in the illustrated example is positioned in the first mobile phase flow line 212 between the flow combiner 214 and the sample injector 236. However, one or more pressure and/or flow sensors 276 may be located at other positions in the mobile phase flow path, including upstream of (before) and downstream from (after) the column 208. As examples, other sensors may be respectively located at the first solvent delivery line 222, the second solvent delivery line 230, the sample loop 274, the second mobile phase line 216, and/or the column output line 258. In the case shown here, the sensor 276 may be configured to output flow measurement signals to the flow rate value corrector 166, either automatically (and either continuously or in predetermined intervals) or in response to an interrogation by the flow rate value corrector 166. The sensor 276 may be any type of sensor suitable for measuring flow rate or pressure in a high-pressure fluidic system. In this case of a pressure sensor, the sensor 276 outputs pressure measurement signals to the flow rate value corrector 166 (FIG. 1), and the flow rate value corrector 166 utilizes the pressure measurement signals to calculate corresponding flow rate values, as appreciated by persons skilled in the art.

The location of the sensor 276 may be considered as being a "measurement" position in the LC system. The method described herein may be performed to determine the (corrected) flow rate at any selected measurement position at which a sensor 276 is located. However, the method may likewise be performed to determine the (corrected) flow rate at any selected "reference" position in the LC system that is different from the measurement position. In this case, the sensor data obtained from measurements taken at the measurement position are utilized to determine the flow rate at the reference position, taking into account as needed the components of the LC system located between the measurement position and the reference position. For example, the sensor 276 may be located at (or near) the outlet of the pumps 206 and 210, or similarly at (or near) the outlet 270 of the flow combiner 214 as in the illustrated example, while the flow being determined (i.e. the reference point) is located at (or near) the outlet of the column 208 or the outlet of the detector 252.

As noted in the background section above, the actual (or real) flow rate of a solvent or composite solvent at a given position in an LC system may be different from the set-point flow rate value at which the LC system has been programmed to operate, and may be different from flow rate value measured by the sensor 276 positioned at a given location. The deviation of the actual flow rate from the set-point flow rate, and in the measured flow rate value from the actual flow rate value, may be of a simple nature such as a static offset or scaling, but may also be more complex due to one or more dynamic (i.e. non-constant or non-steady state) conditions or events occurring in the LC system during operation at a particular point in time. Some of these dynamic conditions or events may be distributed through the LC system, i.e., may be present or occur at one or more positions in the LC system.

Examples of dynamic conditions that may cause a change in flow rate include the reaction elasticity (or compliance) of one or more components of the LC system, such as a fluid conduit or a damper positioned at a pump outlet, due to pressure changes. The elasticity may result in volumetric fluid uptake in reaction to localized pressure changes and consequently changes in flow rate. Another example is a flow restriction (or resistance) imposed by one or more of the components, such as a connecting tubing (capillary), fluidic fitting or the LC column. A restriction may also result in localized pressure changes and consequently changes in flow rate. Generally, localized changes in pressure, viscosity, and temperature at one or more points (or positions) in the flow path(s) of the LC system may result in changes in flow rate. Another example is the compressibility of the solvent or composite solvent at one or more points in the LC system. Another example is the compressibility of a liquid segment (or plug, or volume) added to the mobile phase while driving the mobile phase through the LC system, such as when injecting a sample into the mobile phase flow. Another example is volumetric thermal expansion or contraction of the mobile phase at one or more points in the LC system.

As one specific example, changing the set point of the flow rate as part of the programmed operation of the LC system is attended by a delay in the transition from the previous set point to the new set point. The change in the set point may be associated with switching fluid flow from an OFF state to an ON state, stepping the flow rate up or down, or ramping the flow rate up or down. The resulting delay may be due to the capacitance of the damper at the pump outlet in combination with one or more other dynamic factors such as the restriction of the LC column. The delay may result in inaccurate flow rate measurement.

Related effects take place when running a solvent gradient, which leads to systematic variations in viscosity over time. During a time period when the pressure drop across the column is rising, the damper at the pump outlet is "pumped up," and consequently the column flow is diminished due to volume conservation in the damper. Contrarily, during a time period when the pressure drop across the column is falling, the damper "discharges" fluid, delivering an additional flow of fluid into the column, on top of what the pump is feeding. This can lead to very well visible distortions in a chromatogram, including retention time and peak area bias, as compared to a "rigid" hydraulic system.

Another specific dynamic factor to be considered is the occurrence of volume contraction (or volume loss) when mixing two solvents, which can be as high as 3.5%. Volume contraction becomes readily visible once a binary pump is set to provide a composition step, for example from 0% to 50% organic solvent. Although the viscosity of a water-organic solvent mixture is significantly higher than of water alone, the pressure immediately drops by a few percent upon composition change due to a real flow decrease, and rises only after the transport delay from the mixing point to the column (or to some other restriction in the flow path) has elapsed.

According to the present disclosure, measured flow rate values acquired during operation of an LC system, such as through the use of one or more pressure or flow sensors 276 (FIG. 2), are corrected to enable the generation of accurate flow rate data (reporting). In an embodiment, measured flow rate data are corrected by anticipating (or predicting, or taking into account) the dynamic behavior of the LC system.

In one embodiment, anticipating (or predicting) the dynamic system behavior is accomplished by generating a model of the LC system. To generate the system model, the LC system is considered or characterized as having a certain topology. The topology is defined by an arrangement of components (or elements) of the LC system. Such system components may include the column, the flow combiner, the pumps, and the various fluid lines respectively fluidly coupled to (the inlets and outlets of) the column, the flow combiner, and the pumps. The system model is constructed based on this topology. In one embodiment, the model includes a distribution of capacitive elements and resistive elements arranged according to the actual topology of the LC system. The capacitive elements and the resistive elements are representative of dynamic conditions affecting flow rate while operating the LC system. For example, resistance is influenced by the distribution of fluid viscosity, and capacitance is dependent on the distribution of fluid compressibility in combination with elasticity of hydraulic components.

Figure 3:
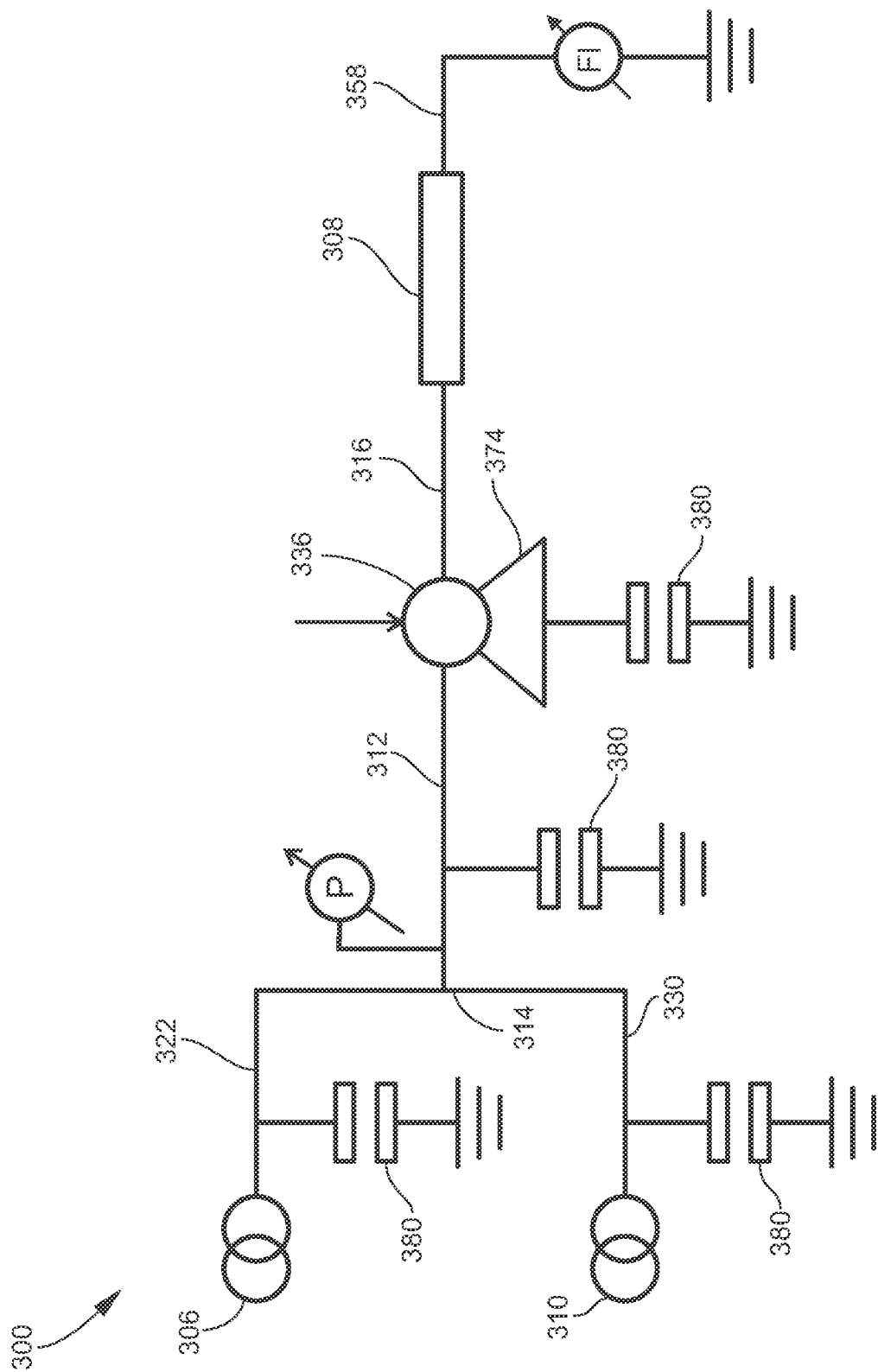
FIG. 3 is a graphical illustration of an example of a system model of an LC system according to an embodiment.

FIG. 3 is a graphical illustration of an example of a system model 300 of an LC system according to an embodiment.

The system model 300 is an example of a model that may be generated by or programmed into the flow rate value corrector 166 described above and illustrated in FIG. 1. The term "programmed into" implies making information, specifically the model parameters, system topology and/or calculation algorithms, available to the flow corrector 166 in form of volatile, rewritable, or hard-coded data. The system model 300 includes components corresponding to the components of the LC system being modeled. Such components may include, but are not limited to, pumps 306 and 310, solvent supply lines 322 and 330, a flow combiner 314, mobile phase flow lines 312, 316, and 358, a sample injector 336 with a sample loop 374, and an LC column 308. In the present example, the topology of the system model 300 reflects the topology of the LC system 200 illustrated in FIG. 2. In addition, the system model 300 includes capacitive elements 380 distributed throughout the topology to account for mechanic and hydraulic properties of the real system such as elasticity and/or solvent compressibility in different parts of the real system, as described above, as well as for the properties and behavior of for example pump drive regulators that control the pumps. The system model 300 also includes resistive elements corresponding to, for example, the column 308.

In an embodiment, the system model 300 may be defined by or constructed from a set of parameter values. The parameter values may be reduced to one or more mathematical transfer functions representative of the dynamic system behavior. At least one of the parameter values is relevant to flow rate. The parameter values and transfer functions may be stored in a memory (such as memory 164 shown in FIG. 1), and accessed by the flow rate value corrector 166 as needed. In some embodiments, the parameter values and transfer functions may be stored in the form of a database or a look-up table.

An example of a method for determining a corrected flow rate value of a mobile phase flowing in an LC system will now be described. First, the LC system is operated to drive the mobile phase with the sample from the pump(s) through the column according to a set-point flow rate value to separate the sample components. In the case of multiple solvents, the mobile phase may be driven to the column from a flow combiner, such as in the example of pump outlet-side mixing described above in conjunction with FIG. 2. During operation, the pressure or flow rate of the mobile phase is measured at a measurement position in the LC system to produce measured data. The measured data may include one or more values of pressure or flow rate, and typically includes multiple values (i.e. a stream of data) of pressure or flow rate over time. The corrected flow rate value(s) is (are) then determined by applying a model of the LC system to the measured data, such as described above in conjunction with FIG. 3. As described herein, the corrected flow rate value(s) so determined may correspond to reference position(s) (or point(s)) in the LC system different from the measurement position(s) (i.e. the points where the measurements are taken, such as by a sensor). In one embodiment, the model is a transfer function that is applied to the measured parameter value as described herein.

The LC system may be operated to perform a sample analysis. That is, the LC system may be operated to inject a sample into the high-pressure mobile phase path, such that the sample is driven with the mobile phase through the LC column to separate different compounds of the sample. The LC system, specifically the controller, receives detection data from the detector and processes the data to produce a chromatogram comprising peaks corresponding to the different compounds. The controller may then modify the chromatogram based on the corrected flow rate value determined by the flow rate value corrector of the controller. Modifying the chromatogram may entail, for example, local stretching or squeezing of the time axis of chromatogram, resulting in shifting multiple data points in the chromatogram along the time axis and thus also in shifting retention time values of one or more of the peaks in the chromatogram.

In another embodiment, the corrected flow rate value may be utilized to adjust an operating parameter of the LC system such that the corrected flow rate value of the mobile phase at the reference position (i.e., to which the determined flow rate value applies) is equal to or substantially equal to the set-point flow rate value according to which the LC system was programmed to operate. One non-limiting example of an operating parameter that may be adjusted is the pumping speed (e.g., piston speed) of one or more pumps of the LC system utilized to supply solvent.

In some embodiments, the flow rate is determined by using data of a pressure sensor such that the measurement signal is a pressure signal. In this case, the determination of the measured flow rate value is based on processing of the pressure signal.

In an embodiment, the steps of measuring the flow rate and applying the model may be repeated for one or more additional measurement or reference positions to produce one or more additional corrected flow rate values within the system. For example, as described above, the LC system may include multiple sensors located at respective positions in the flow path(s) of the LC system, from which local flow rates may be measured.

It will be understood that FIGS. 1 and 2 are high-level schematic depictions of examples of an LC system 100 and 200, and an associated controller 160, consistent with the present disclosure. Other components, such as for directing, controlling and/or conditioning fluid flow, as well as various sensors, electronics, and computer-related or electronic processor-related components may be included as needed for practical implementations. It will also be understood that the controller 160 is schematically represented in FIG. 1 as functional blocks intended to represent structures (e.g., circuitries, mechanisms, hardware, firmware, software, etc.) that may be provided. The various functional blocks and signal links have been arbitrarily located for purposes of illustration only and are not limiting in any manner. Persons skilled in the art will appreciate that, in practice, the functions of the controller 160 may be implemented in a variety of ways and not necessarily in the exact manner illustrated in FIG. 1 and described herein.

Methods for determining a corrected flow rate as described herein and illustrated in the drawing figures may be performed (carried out), for example, in a system that includes a processor and a memory as may be embodied in, for example, a controller (e.g., a computing device), such as the controller 160 described herein and illustrated in FIG. 1, which may communicate with a user input device and/or a user output device. In some embodiments, a system for determining a corrected flow rate (or an associated computing device) may be considered as including the user input device and/or the user output device. An LC system such as described above and illustrated in the drawing figures may include, or be part of, or communicate with a system for determining a corrected flow rate. As used herein, the term "perform" or "carry out" may encompass actions such as controlling and/or signal or data transmission. For example, a computing device such as illustrated in FIG. 1, or a processor thereof, may perform a method step by controlling another component involved in performing the method step. Performing or controlling may involve making calculations, or sending and/or receiving signals (e.g., control signals, instructions, measurement signals, parameter values, data, etc.).

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the controller 160 schematically depicted in FIG. 1. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), application specific integrated circuits (ASICs), field-programmable gate arrays (FPGAs), etc. Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the controller 160 in FIG. 1), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It will also be understood that the term "in signal communication" or "in electrical communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for determining a corrected flow rate measurement value of a mobile phase flowing in a liquid chromatography (LC) system, the LC system comprising a column configured to separate sample components of a sample and one or more pumps configured to deliver one or more solvents as a mobile phase and to drive the mobile phase through the column, the method comprising:

operating the LC system to drive the mobile phase with the sample through the column according to a set-point flow rate value to separate the sample components;

while operating the LC system to drive the mobile phase, measuring a pressure or a flow rate of the mobile phase at a measurement position in the LC system to produce measured data, the measured data comprising values of pressure or flow rate over time; and determining a corrected flow rate measurement value of the measured data by applying a model of the LC system to the measured data, wherein:

the LC system has a topology defined by an arrangement of system components, the system components comprising the column, the one or more pumps, and a plurality of fluid lines respectively fluidly coupled to the column and the one or more pumps;

the model comprises a distribution of capacitive elements and resistive elements arranged according to the topology, the capacitive elements and the resistive elements being representative of system and solvent properties affecting flow rate while operating the LC system; and the model is applied to the measured data to determine the corrected flow rate measurement value at a reference position in the LC system different from the measurement position.

2. The method of claim 1, comprising repeating the steps of measuring the pressure or the flow rate and determining the corrected flow rate measurement value for one or more additional reference positions to produce one or more additional corrected flow rate measurement values corresponding to the one or more additional reference positions.

3. The method of claim 1, wherein the system and solvent properties comprise properties affecting the flow rate while operating the LC system under dynamic conditions.

4. The method of claim 3, wherein the dynamic conditions comprise changes over time of one or more of the system and solvent properties.

5. The method of claim 3, wherein the dynamic conditions comprise changes over time of one or more of the system and solvent properties selected from the group consisting of:
changes of cavity volume in a section of a flow path due to elasticity;
changes of an elasticity of one or more of the system components;
changes of a flow restriction imposed by one or more of the system components to a flow of one or more of the solvents;
changes of a viscosity of the mobile phase at one or more points in the LC system;
changes in occupied volume by solvent in a section of a flow path due to compressibility in reaction to pressure changes;
changes of a solvent compressibility at one or more points in the LC system;
changes of a volumetric contraction of the mobile phase at one or more points in the LC system;
changes in occupied volume by solvent in a section of a flow path due to thermal expansion in reaction to local temperature changes;
changes of a thermal expansion coefficient of the mobile phase at one or more points in the LC system;
switching a volume compartment into or out of a flow path of the LC system;
switching a flow path of the LC system;
changing a mixing ratio of the mobile phase while driving the mobile phase; and
a combination of two or more of the foregoing.

6. The method of claim 1, wherein:
the LC system comprises a flow combiner;
the one or more respective solvents comprise a plurality of solvents; and
the one or more pumps are configured to deliver the plurality of solvents to the flow combiner to form a composite solvent as the mobile phase and to drive the mobile phase from the flow combiner through the column.

7. The method of claim 1, wherein the system and solvent properties are selected from the group consisting of:
an elasticity of one or more of the system components;
a flow restriction imposed by one or more of the system components to a flow of one or more of the solvents or a mixture thereof;
a pressure of the mobile phase at one or more points in the LC system;
a viscosity of the mobile phase at one or more points in the LC system;
a temperature of the mobile phase at one or more points in the LC system;
a solvent compressibility at one or more points in the LC system;
a compressibility of a liquid segment added to the mobile phase while driving the mobile phase;
a volumetric contraction of the mobile phase at one or more points in the LC system;
a thermal expansion coefficient of the mobile phase at one or more points in the LC system; and
a combination of two or more of the foregoing.

8. The method of claim 1, comprising, before measuring the pressure or the flow rate, injecting a liquid segment into the mobile phase at a position upstream of the column.

9. The method of claim 1, comprising, while operating the LC system to drive the mobile phase, varying a solvent composition of the mobile phase over time according to a gradient program.

10. The method of claim 1, wherein measuring the pressure or the flow rate is done at a time when the LC system starts to drive the mobile phase.

11. The method of claim 1, comprising stopping the driving of the mobile phase, wherein measuring the pressure or the flow rate is done after stopping.

12. The method of claim 1, comprising operating the LC system to vary the flow rate while driving the mobile phase, wherein measuring the flow rate is done while varying the flow rate.

13. The method of claim 1, wherein determining the corrected flow rate measurement value is done over a period of time selected from the group consisting of:
determining the corrected flow rate measurement value is done over continuous segments of time during operation of the LC system; and
determining the corrected flow rate measurement value is done continuously during operation of the LC system.

14. The method of claim 1, comprising producing a chromatogram comprising peaks corresponding to the sample components separated in the column and detected by a detector of the LC system.

15. The method of claim 14, comprising modifying the chromatogram based on the corrected flow rate measurement value.

16. The method of claim 15, wherein modifying the chromatogram comprises a step selected from the group consisting of:
shifting one or more signal data points produced by the detector along a time axis of the chromatogram; and
shifting one or more of the peaks along a time axis of the chromatogram.

17. The method of claim 1, comprising, based on the corrected flow rate measurement value, adjusting an operating parameter of the LC system such that the corrected flow rate measurement value of the mobile phase at a reference position in the LC system is equal to or substantially equal to the set-point flow rate value, wherein the reference position is the same as the measurement position or is different from the measurement position.

18. The method of claim 1, wherein applying the model comprises accessing data stored in a memory, and the data are indicative of the distribution of capacitive elements and resistive elements arranged according to the topology or along a flow path.

19. A liquid chromatography (LC) system, comprising:
a column configured to separate configured to separate sample components of a sample of the sample;

one or more pumps configured to deliver one or more solvents as a mobile phase and to drive the mobile phase with the sample through the column to separate the sample components;

a plurality of fluid lines respectively fluidly coupled to the column and the one or more pumps; and a controller comprising a processor, a memory, and a flow rate value corrector configured to:

receive a measured signal value for pressure or flow rate of the mobile phase at a measurement position in the LC system; and apply a model of the LC system to the measured signal value to produce a corrected flow rate measurement value of the measured data, wherein:

the LC system has a topology defined by an arrangement of system components, the system components comprising the column, the one or more pumps, and the plurality of fluid lines;

the model comprises a distribution of capacitive elements and resistive elements arranged according to the topology, the capacitive elements and the resistive elements being representative of system and solvent properties affecting flow rate while operating the LC system under dynamic conditions; and the model is applied to the measured data to determine the corrected flow rate measurement value at a reference position in the LC system different from the measurement position.

* * * * *